US011068606B2

(12) United States Patent  
Baboval et al.

(10) Patent No.: US 11,068,606 B2  
(45) Date of Patent: Jul. 20, 2021

(54) SECURED ENCRYPTED SHARED CLOUD STORAGE

(71) Applicant: Citrix Systems, Inc., Fort Lauderdale, FL (US)

(72) Inventors: John Baboval, Burlington, MA (US); Thomas Goetz, Burlington, MA (US); Simon P. Graham, Burlington, MA (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 194 days.

(21) Appl. No.: 15/710,315

(22) Filed: Sep. 20, 2017

(65) Prior Publication Data

US 2019/0087588 A1    Mar. 21, 2019

(51) Int. Cl.
| | |
|---|---|
| *G06F 21/60* | (2013.01) |
| *G06F 3/06* | (2006.01) |
| *H04L 9/06* | (2006.01) |
| *H04L 9/14* | (2006.01) |
| *H04L 9/08* | (2006.01) |
| *G06F 21/62* | (2013.01) |

(52) U.S. Cl.
CPC ............ *G06F 21/602* (2013.01); *G06F 3/067* (2013.01); *G06F 3/0622* (2013.01); *G06F 3/0623* (2013.01); *G06F 3/0641* (2013.01); *G06F 3/0659* (2013.01); *G06F 21/6218* (2013.01); *H04L 9/0643* (2013.01); *H04L 9/0841* (2013.01); *H04L 9/0894* (2013.01); *H04L 9/14* (2013.01)

(58) Field of Classification Search
CPC .... G06F 21/602; G06F 21/6218; G06F 3/067; H04L 9/0841; H04L 9/0643
USPC ......................................................... 713/193
See application file for complete search history.

(56) References Cited

U.S. PATENT DOCUMENTS

| | | | | |
|---|---|---|---|---|
| 4,730,348 | A * | 3/1988 | MacCrisken | H03M 7/42 370/472 |
| 7,099,325 | B1 * | 8/2006 | Kaniz | H04L 29/12009 370/392 |
| 8,315,984 | B2 * | 11/2012 | Frandzel | G06F 3/0608 707/661 |
| 8,417,876 | B2 * | 4/2013 | Gorobets | G06F 12/0246 711/103 |
| 8,543,757 | B2 * | 9/2013 | Gorobets | G06F 12/0246 711/103 |

(Continued)

*Primary Examiner* — Tae K Kim  
*Assistant Examiner* — Peiliang Pan  
(74) *Attorney, Agent, or Firm* — Fox Rothschild LLP; Robert J. Sacco; Carol E. Thorstad-Forsyth (57) ABSTRACT

Secure shared access to encrypted data in a data store is facilitated by using a data control server (DCS) to maintain a data storage reference table (DSRT) for shared data units present in a shared data pool hosted by least one data storage device, and accessible to a plurality of computing entities. The DSRT specifies for each shared data unit identifier information, location information for accessing the shared data unit in the shared data pool, and a hash value which has been computed for the shared data unit. The DCS selectively facilitates a decryption operation by providing hash values which serves as a basis for deriving a decryption key for decrypting shared data units which have been identified.

16 Claims, 8 Drawing Sheets

(56) References Cited

U.S. PATENT DOCUMENTS

| | | | |
|---|---|---|---|
| 8,751,763 B1* | 6/2014 | Ramarao | G06F 16/1752 |
| | | | 711/162 |
| 8,856,530 B2* | 10/2014 | Patti | H04L 9/0825 |
| | | | 713/171 |
| 8,880,476 B2* | 11/2014 | Noronha | G06F 3/0641 |
| | | | 707/649 |
| 9,081,771 B1* | 7/2015 | Faibish | G06F 16/00 |
| 9,141,554 B1* | 9/2015 | Candelaria | G06F 12/0864 |
| 9,197,560 B2* | 11/2015 | Gabriel | H04L 41/5022 |
| 9,846,718 B1* | 12/2017 | Ruef | G06F 3/0641 |
| 10,397,185 B1* | 8/2019 | Sandholm | H04L 63/0209 |
| 2005/0071571 A1* | 3/2005 | Luick | G06F 12/0862 |
| | | | 711/137 |
| 2006/0218200 A1* | 9/2006 | Factor | G06F 16/2358 |
| 2007/0016756 A1* | 1/2007 | Hsieh | G06F 12/0246 |
| | | | 711/216 |
| 2008/0034024 A1* | 2/2008 | Saveli | H03H 17/0009 |
| | | | 708/313 |
| 2010/0031000 A1* | 2/2010 | Flynn | G06F 16/9014 |
| | | | 711/216 |
| 2010/0095064 A1* | 4/2010 | Aviles | H04L 67/1097 |
| | | | 711/118 |
| 2010/0316053 A1* | 12/2010 | Miyoshi | H04L 45/00 |
| | | | 370/392 |
| 2011/0055277 A1* | 3/2011 | Resch | H04L 63/20 |
| | | | 707/785 |
| 2011/0153913 A1* | 6/2011 | Huang | G06F 3/0611 |
| | | | 711/103 |
| 2012/0017060 A1* | 1/2012 | Kapanipathi | G06F 3/0608 |
| | | | 711/162 |
| 2012/0027134 A1* | 2/2012 | Gladwin | G06F 21/6218 |
| | | | 375/340 |
| 2012/0066473 A1* | 3/2012 | Tremaine | G06F 13/1694 |
| | | | 711/206 |
| 2012/0260021 A1* | 10/2012 | Rudelic | G06F 3/0641 |
| | | | 711/103 |
| 2012/0323860 A1* | 12/2012 | Yasa | G06F 16/1748 |
| | | | 707/692 |
| 2013/0028021 A1* | 1/2013 | Sharon | G11C 16/3459 |
| | | | 365/185.17 |
| 2013/0151759 A1* | 6/2013 | Shim | G06F 3/0608 |
| | | | 711/103 |
| 2013/0238876 A1* | 9/2013 | Fiske | G06F 3/0641 |
| | | | 711/216 |
| 2013/0326154 A1* | 12/2013 | Haswell | G06F 12/0864 |
| | | | 711/141 |
| 2013/0343388 A1* | 12/2013 | Stroud | H04L 47/00 |
| | | | 370/392 |
| 2014/0115256 A1* | 4/2014 | Liu | G06F 12/0866 |
| | | | 711/122 |
| 2014/0115258 A1* | 4/2014 | Week | G06F 16/1752 |
| | | | 711/133 |
| 2014/0136759 A1* | 5/2014 | Sprouse | G11C 11/5642 |
| | | | 711/103 |
| 2014/0136764 A1* | 5/2014 | Li | G11C 16/22 |
| | | | 711/103 |
| 2014/0317479 A1* | 10/2014 | Candelaria | G06F 11/0727 |
| | | | 714/807 |
| 2015/0095346 A1* | 4/2015 | Kimmel | G06F 3/0608 |
| | | | 707/747 |
| 2015/0169613 A1* | 6/2015 | Bshara | G06F 16/1752 |
| | | | 707/692 |
| 2015/0178189 A1* | 6/2015 | Lasser | G06F 11/1008 |
| | | | 714/6.11 |
| 2015/0268864 A1* | 9/2015 | Bernat | G06F 3/065 |
| | | | 711/162 |
| 2016/0170823 A1* | 6/2016 | Miller | G06F 11/0772 |
| | | | 714/56 |
| 2016/0196320 A1* | 7/2016 | Borowiec | G06F 11/1451 |
| | | | 707/624 |
| 2016/0246537 A1* | 8/2016 | Kim | G06F 11/108 |
| 2016/0321133 A1* | 11/2016 | Oliver | H04L 63/064 |
| 2016/0352511 A1* | 12/2016 | Bashyam | G06F 11/1004 |
| 2017/0084328 A1* | 3/2017 | Hsu | G11C 16/3459 |
| 2017/0097909 A1* | 4/2017 | Simionescu | G06F 3/0656 |
| 2018/0083914 A1* | 3/2018 | Yamaura | H04W 12/12 |
| 2018/0329645 A1* | 11/2018 | Guerra Delgado | G06F 3/0647 |
| 2019/0050541 A1* | 2/2019 | Wright | H04L 9/0643 |
| 2019/0056966 A1* | 2/2019 | Baboval | G06F 3/0604 |

* cited by examiner

Data Storage Reference Table 600

| Hash Table Row ("HTR") Identifier ("ID") | Hash Value ("HV") | Addressable Cloud Storage Pool ("ACSP") ID | ACSP Offset Value ("OV") |
|---|---|---|---|
| HTR ID $606_1$ | HV $702_1$ | ACSP ID $704_1$ | ACSP OV $706_1$ |
| HTR ID $606_2$ | HV $702_2$ | ACSP ID $704_2$ | ACSP OV $706_2$ |
| ⋮ | ⋮ | ⋮ | ⋮ |
| HTR ID $606_N$ | HV $702_N$ | ACSP ID $704_N$ | ACSP OV $706_N$ |

FIG. 6

SECURED ENCRYPTED SHARED CLOUD STORAGE

BACKGROUND

Statement of the Technical Field

This document relates generally to cloud computing systems, and more particularly to implementing systems and methods for deduplicated data storage in a cloud environment.

Description of the Related Art

Cloud computing allows one or more users to utilize applications or services running on a remotely located computer rather than on the user's local computer. For example, data may be processed in the cloud by forwarding the data from a client computer to a server computer, where the data is processed before returning the processed data back to the client computer. This way, the client computer offloads processing tasks to computers in the cloud. The cloud-based computing resources generally allow for the operating systems, applications, and user settings of multiple users to be included on a single physical machine. Virtualization technology allows multiple instances of a guest operating system to be kept separate within a normal host operating system, so the activities of one user may not affect the experience of other users.

In some instances, a cloud services provider may provide infrastructure to serve one or more tenants of the cloud services provider. Individual server farms may host multiple tenants and may be generally configured to support the virtualization computing needs of those tenants. The data storage requirements can be facilitated by cloud-based data storage infrastructure.

SUMMARY

The present solution concerns implementing systems and methods for secure shared access to encrypted data in a data store. The method involves maintaining a data storage reference table (DSRT) at a data control server (DCS). The DSRT contains information concerning shared data units stored in encrypted form in a shared data pool hosted by least one data storage device. According to one aspect, each of the shared data units described herein are comprised of a block of data.

The shared data units are accessible to a plurality of computing entities, such as a plurality of workloads associated with a cloud computing system. For each shared data unit, the DSRT contains identifier information, location information for accessing the shared data unit in the shared data pool, and a hash value which has been computed for the shared data unit. The method further involves receiving one or more requests from one or more of the computing entities. Each such request will specify identifier information for at least one of the shared data units. Responsive to receiving such requests, the DCS will selectively facilitate a decryption operation of the shared data unit which has been specified. This step involves communicating to the computing entity which initiated the request one of the plurality of hash values which corresponds to the identifier information. This step can also involve communicating to the computing entity which initiated the request certain location information for the shared data unit which has been specified.

A decryption key for the shared data unit which has been specified is derivable from the hash value which is communicated to the computing entity. Accordingly, a computing entity which receives the hash value can decrypt the content of the shared data unit which has been requested by using the decryption key.

The DCS can also receive from at least a second one of the computing entities a second hash value which has been computed for a second data unit comprising unencrypted write data. For example, the second hash value can be computed by the second computing entity. Once received, the DCS can compare the second hash value to the hash values contained in the DSRT. Based on such comparison, the DSRT will selectively update the DSRT to include the second hash value if the second hash value is determined to be absent from the DSRT. The DCS can also receive from the second computing entity, second location information. The second location information specifying a memory location in the shared data pool where the second data unit has been stored in encrypted form as a result of a write operation requested by the second one of the computing entities. Accordingly, the updating can further involve storing the second location information in the DSRT in association with the second hash value.

The second data unit is encrypted by the second computing entity prior to being stored by using a second encryption key that has been derived from the second hash value. The second encryption key used for this encrypting operation is derived from the second hash value by the second computing entity.

The system also concerns a system for facilitating secure shared access to encrypted data in a data store. The system is comprised of a data control server (DCS) which includes at least one electronic processor. The system will also include a server data store (SDS) accessible to the DCS. The DCS is configured to maintain in the server data store the DSRT as described above. The DCS is responsive to one or more of the requests from one or more of the computing entities to selectively facilitate decryption operation of shared data unit as described

BRIEF DESCRIPTION OF THE DRAWINGS

Embodiments will be described with reference to the following drawing figures, in which like numerals represent like items throughout the figures.

DETAILED DESCRIPTION

It will be readily understood that the components of the disclosed methods and systems as generally described herein and illustrated in the appended figures could be arranged and designed in a wide variety of different configurations. Thus, the following more detailed description, as represented in the figures, is not intended to limit the scope of the present solution, but is merely representative of various possible scenarios. While the various aspects of the systems and methods are presented in drawings, the drawings are not necessarily drawn to scale unless specifically indicated.

The methods and system presented herein may be embodied in other specific forms without departing from its spirit or essential characteristics. The descriptions and explanations provided herein are to be considered in all respects only as illustrative and not restrictive. The scope of the solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

A cloud computing environment can comprise cloud-based data storage infrastructure consisting of one or more data storage devices. In such scenarios a plurality of cloud-based servers can then store data using the available data storage devices. One or more of the data storage devices comprising the data storage infrastructure can be comprised of magnetic hard disks, solid state memory resources, or other types of mass memory storage. The data in such devices can be stored as blocked data, wherein each block is an addressable memory unit comprised of one or more sectors. Blocks or sectors of data from one or more data storage devices can be logically grouped together to form a data storage pool. Thus, the term "storage pool", as used herein, refers to a data storage capacity aggregated from one or more storage resources.

One or more storage pools can be defined in the cloud-based data storage infrastructure. The storage pools can have the same or different sizes. A data storage pool can be made accessible to one or more workloads. In some scenarios, the workloads may be hosted on the cloud-based servers. In other scenarios, the workloads may be hosted on endpoint user devices. A workload as referenced herein refers to computing resources which are dedicated for performing specific computing tasks. Accordingly, a workload can in some scenarios comprise a server computer (e.g., a cloud-based server computer) which is assigned certain computing tasks. In other scenarios, a workload can comprise a virtual machine. The virtual machine may be executing in a server computer or in a client machine associated with the cloud computing environment. Still, other scenarios are possible and the solution herein can facilitate data storage for any type of workload executing on any type of machine.

In some scenarios, it is desirable to configure the cloud-based data storage infrastructure to instantiate and support one or more virtual disks or virtual drives to support one or more workloads. As is known, the virtual disk drive or a virtual drive is a software service that emulates an actual physical disk storage device. In such scenarios it can sometimes be desirable to store certain blocks of data in a virtual disk which is associated with a data storage pool (shared pool).

If access to the same data is required by multiple workloads, then such data is advantageously stored only once in the shared data storage pool. For example, it can be advantageous to store only a single copy of virtual disk versions or layers data, which can then be shared amongst many workloads. This approach avoids the duplication of stored data to facilitate greater data storage efficiency and cost savings where fees are charged based on the amount of data which has been stored. However, cloud storage environment access control is generally only granular to a pool of blocks, not to each individual block. So in such a scenario, every workload accessing the shared pool will be able to read every data block in the pool. This is not desirable since it is often the case that a particular workload should only have access to a subset of the data blocks.

In the scenario described above, encrypting all of the blocks of data comprising a particular object in a shared pool will mitigate the risk of allowing workloads to have read access to blocks they aren't authorized to access. However, management of data encryption keys can be burdensome in such a configuration. Accordingly, the systems and methods disclosed herein can allow cloud workloads to securely store and access data blocks in a shared pool to facilitate deduplication, while minimizing any burdensome key management.

To accomplish the foregoing, a data control server (DCS) is used. The DCS selectively controls access, of a plurality of workloads or clients, to the pooled data contained in the cloud storage infrastructure. According to one aspect, each data block in the shared pool is encrypted in accordance with a key derived from a hash value of the unencrypted content of that block. The DCS maintains a table or relational database comprising the hash values of each block which is stored in the data pool. Within such table, each hash value will serve as an index to a specific address or offset value which indicates where the data having the specified hash value can be found within the shared pool. For purposes of the present solution, a hash function that is used to calculate hash values is advantageously selected to be a cryptographic hash function.

A benefit of the hash-derived key as disclosed herein is realized during a write operation. When a particular workload requires a write operation, it will already know the unencrypted contents of the data that is to be written. Accordingly, the workload can calculate the hash value for such data, and if necessary can derive a cryptographic key to encrypt the stored data.

Thereafter, the workload can authenticate itself to the DCS and communicate the hash value for the block of data. The table maintained by the DCS includes hash values for all of the blocks stored in the shared data pool, cross-referenced to locations of those blocks in the shared data pool. So the hash value provided by the workload can be used by the DCS to determine whether the data corresponding to the hash value is already present in the shared pool. The DCS accomplishes this result by comparing the hash value communicated by the workload to the hash values stored in its table or relational database. Accordingly, the hash value can be useful to facilitate de-duplication of data in the shared data pool without giving workloads unencrypted access to all of the blocks contained therein. Further, if the block is to be stored in the shared pool, the workload can itself generate an encryption key directly from the calculated hash value to facilitate encryption of the block before it is transferred for storage.

For read operations, the workload will not have available to it the data to be read, so it will not be able to generate the hash needed for deriving an encryption key. Instead, the workload will communicate with the DCS, which can access the table that maps disk LBA values to cloud storage location and hash value. The hash value can then be used to generate the encryption key that is necessary to decrypt the data.

For convenience, embodiments of the solution disclosed herein will be presented in various scenarios involving storing individual disk blocks. However, it should be appreciated that embodiments are not limited in this regard and the same techniques could be used for other types of data objects. For example, a similar methodology could be used for storing data files. Thus, the detailed description below, which is presented in terms of block data storage should be broadly understood as merely one possible example. The methods and systems disclosed herein can broadly include other types of data objects without limitations. For convenience, these various different types of data objects may sometimes be referred to herein as data units.

Figure 1:
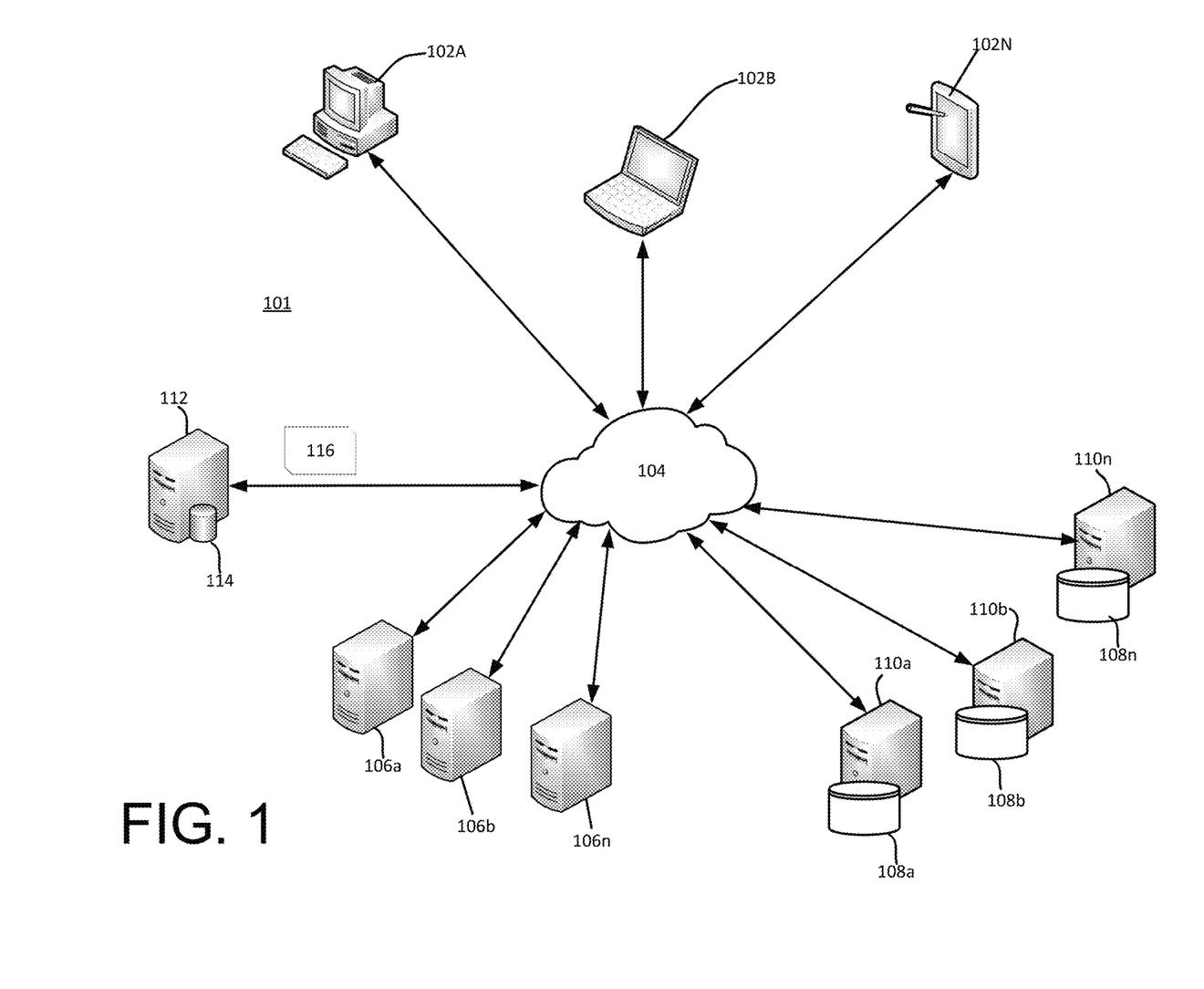
FIG. 1 is an illustration of an exemplary network and computing environment.

Referring now to FIG. 1, there is shown a schematic block diagram illustrating an example computing environment 101 in which the certain aspects of the systems and methods described herein may be implemented. The computing environment 101 includes one or more client machines 102a-102n (generally referred to herein as "client machine(s) 102a-n") in communication with one or more servers 106a-106n (generally referred to herein as "server(s) 106a-n"). Installed between the client machine(s) 102a-n and server(s) 106a-n is a network 104. Also connected to the network is cloud data storage infrastructure comprising one or more data storage devices 108a, 108b, 108n. (generally referred to as "data storage devices 108a-n"). As such, the servers 106a-n are also in communication with the data storage devices 108a-n. In some scenarios, the operation of the storage devices can be managed and controlled by one or more server computers 110a, 110b, 110n (generally referred to herein as "servers 110a-n"). Also connected to the network 104 is an access control server (DCS) 112. As such, the client machines 102a-n and servers 106a-n are also in communication with the DCS 112.

The server(s) 106a-n can be logically grouped together into a server farm. The server farm can include servers that are geographically dispersed and logically grouped together in a server farm, or servers that are located proximate to each other and logically grouped together in a server farm. Geographically dispersed servers within a server farm can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some scenarios the server farm may be administered as a single entity, while in other embodiments the server farm can include multiple server farms.

In some scenarios, a server farm can include server(s) 106a-n that execute a substantially similar type of operating system platform (e.g., WINDOWS NT, manufactured by Microsoft Corp. of Redmond, Wash., UNIX, LINUX, or SNOW LEOPARD.) In other scenarios, the server farm can include a first group of servers that execute a first type of operating system platform, and a second group of servers that execute a second type of operating system platform. The server farm, can also include servers that execute different types of operating system platforms.

The server(s) 106a-n can be any server type. For example, a server can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality.

One or more client machine(s) 102a-n and/or one or more server(s) 106a-n are configured to transmit data over the network 104. The network 104 can comprise one or more sub-networks. Moreover, the network can be installed between any combination of the client machine(s) 102a-n, server(s) 106a-n, data storage devices 108a-n included within the computing environment 101. The network 104 can be: a local-area network (LAN); a metropolitan area network (MAN); a wide area network (WAN); a primary network comprised of multiple sub-networks located between the client machines 102a-n, the servers 106a-n and the data storage devices 108a-n; a primary public network with a private sub-network; a primary private network with a public sub-network 104; or a primary private network with a private sub-network.

One or more of the client machines 102a-n and/or servers 106a-n can support one or more virtual computing machines (virtual machines). For example, the virtual machines can be instantiated and execute in one or more of the client machines 102a-n and/or servers 106a-n to facilitate cloud computing services offered to users of client machines 102a-n. In the context of this description, the term "virtual machine" may denote a software emulation of a particular physical computer system. Virtual machines may operate based on the computer architecture and functions of a real or hypothetical computer and their implementations may involve specialized hardware, software, or a combination of both. The virtual machine can be any virtual machine, while in some embodiments the virtual machine can be any virtual machine managed by a hypervisor developed by XenSolutions, Citrix Systems, IBM, VMware, or any other hypervisor. In other embodiments, the virtual machine can be managed by any hypervisor, while in still other embodiments, the virtual machine can be managed by a hypervisor executing on a server or a hypervisor executing on a client machine.

Data storage devices 108a-n comprise a cloud-based data storage infrastructure which is shared by one or more workloads consisting of the servers 106a-n and/or virtual machines executing on such servers. In some scenarios, the cloud-based data storage infrastructure may also be shared by one or more workloads associated with the client machines 102a-n. One or more of the data storage devices comprising the data storage infrastructure can be logically grouped together to form a data storage pool. As such, the data storage devices 108a-n are sometimes referred to herein as a shared pool of data storage resources. The cloud-based data storage infrastructure can comprise multiple physical data storage devices located at one or more data storage farms which are made accessible over the network 104. One or more of the data storage devices 108a-n can comprise a hard disk drive (HDD), hard disk, hard drive or fixed disk that uses magnetic storage to store and retrieve digital information using one or more rigid rapidly rotating disks (platters) coated with magnetic material. In other scenarios, the data storage devices can include an optical data storage device in which digital data is stored on an optical medium, or a solid-state drive (SSD) which uses solid state computer storage media.

Workloads hosted on one or more of the client machines 102a-n and/or cloud-based servers 106a-n can be provisioned with one or more virtual disks (not shown in FIG. 1). These virtual disks can be supported or hosted by the data storage devices 108a-n of the cloud-based data storage infrastructure. As is known, a virtual disk can comprise a single file or a set of files split into smaller parts that logically represent a hard disk (data storage device) which is accessible to one or more of the workloads. Each virtual disk can comprise a plurality of blocks such that the data contained on the virtual disk may be referred to as blocked data. As is known, a block is comprised of a sequence of bits or bytes and usually contains some whole number of data records. Each block will have a predefined maximum length which defines a block size. Blocked data is usually read or written to a data buffer as one entire block at a time.

Figure 2:
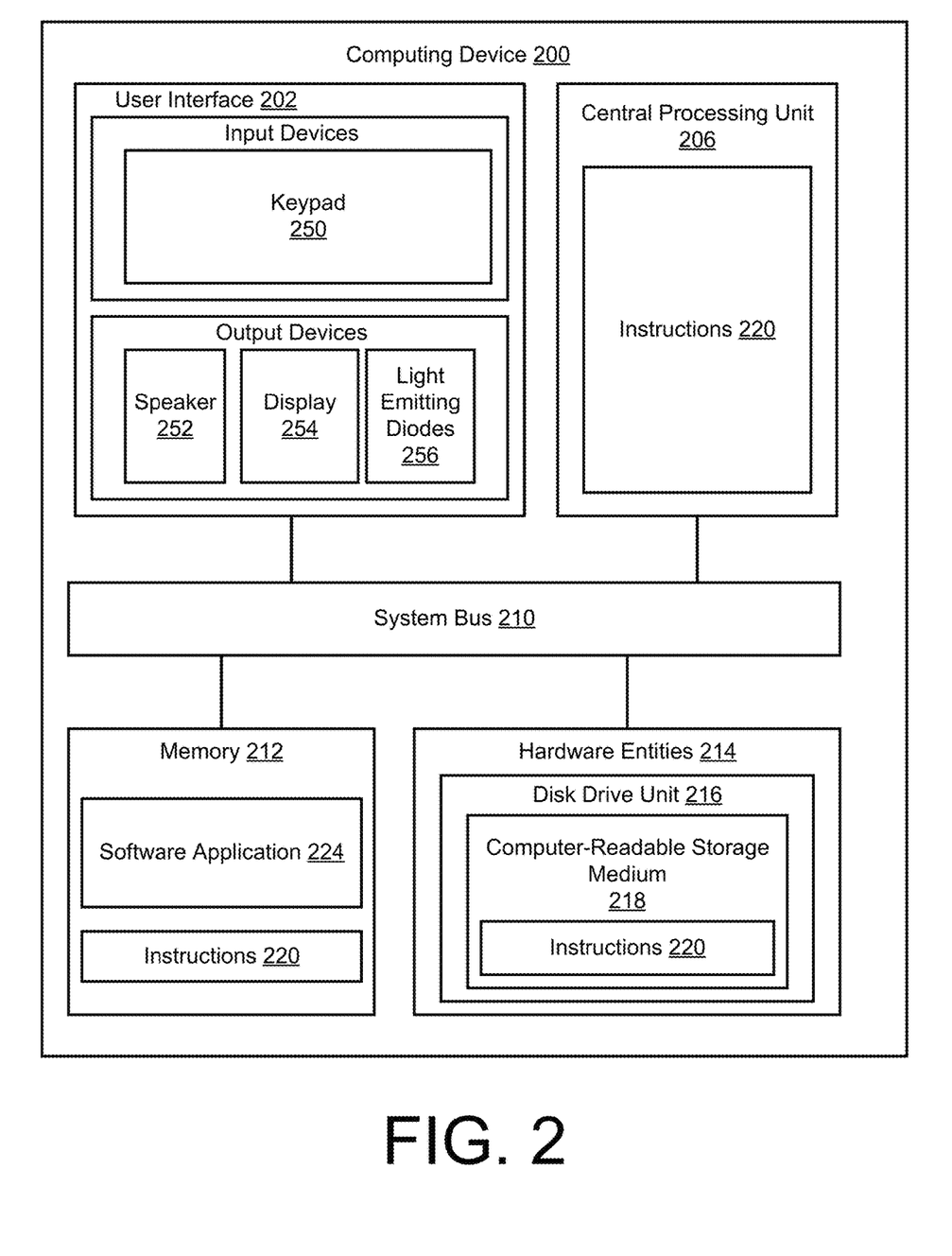
FIG. 2 is an illustration of an exemplary computing device.

Referring now to FIG. 2, there is provided a detailed block diagram of an exemplary architecture for a computing device 200. The client machine(s) 102a-n, server(s) 106a-n, servers 110a-n, and server 112 can be deployed as and/or execute on any embodiment of the computing device 200. As such, the following discussion of computing device 200 is sufficient for understanding client machine(s) 102a-n, server(s) 106a-n, servers 110a-n and server 112 of FIG. 1.

Computing device 200 may include more or less components than those shown in FIG. 2. However, the components shown are sufficient to disclose an illustrative embodiment implementing the present solution. The hardware architecture of FIG. 2 represents one embodiment of a representative computing device configured to facilitate storage and/or transmission of sensitive information in a cloud computing environment. As such, the computing device 200 of FIG. 2 implements at least a portion of a method for secure encrypted shared cloud storage.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices (e.g., a keypad 250) and output devices (e.g., speaker 252, a display 254, and/or light emitting diodes 256), which facilitate user-software interactions for controlling operations of the computing device 200.

At least some of the hardware entities 214 perform actions involving access to and use of memory 212, which can be a RAM, a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies, as described herein.

In some scenarios, the hardware entities 214 include an electronic circuit (e.g., a processor) programmed for facilitating secure, encrypted, shared cloud storage in a cloud computing environment. In this regard, it should be understood that the electronic circuit can access and run a software application 224 installed on the computing device 200. The functions of the software application 224 will become apparent as the discussion progresses.

A shared pool of data storage resources 108a-n as described herein can support multiple workloads in a cloud computing environment. A workload as described herein can comprise defined processing activities associated with one or more servers 106a-n. However, in some scenarios a workload can comprise defined processing activities associated with one or more virtual machines which are executing on one or more of the servers 106a-n. Accordingly, a brief discussion of a virtualization environment is provided with reference to FIG. 3.

Figure 3:
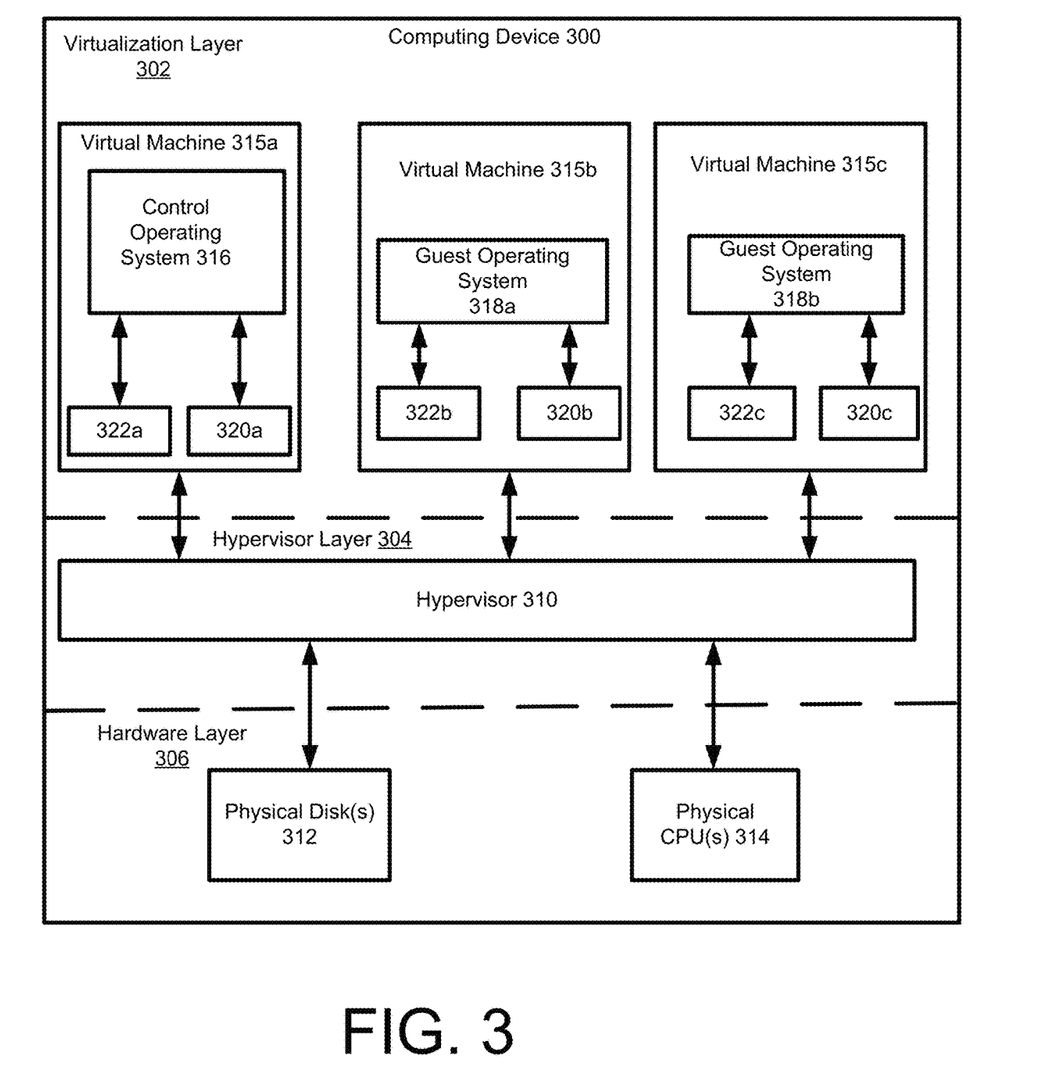
FIG. 3 is a block diagram illustrating an embodiment of a virtualization environment.

Shown in FIG. 3 is a virtualization environment which may be instantiated in an exemplary server computer 300. Server computer 300 includes a virtualization layer 302, a hypervisor layer 304 and a hardware layer 306. The hypervisor layer includes a hypervisor 310 (also referred to as a virtualization manager) that allocates and manages access to a number of physical resources in the hardware layer (e.g., the processor(s) 314, and disk(s) 312) by at least one virtual machine executing in the virtualization layer. The virtualization layer includes at least one operating system and a plurality of virtual resources allocated to the at least one operating system. The operating systems can include a control operating system 316, guest operating systems 318a, 318b. Virtual resources may include, without limitation, a plurality of virtual processors 320a, 320b, and 320c, and virtual disks 322a, 322b, and 322c, as well as virtual resources such as virtual memory and virtual network interfaces. The plurality of virtual resources and the associated operating system may be referred to as a virtual machine 315a, 315b, 315c (collectively 315a-c). A virtual machine 315a may include a control operating system 316 in communication with the hypervisor 310 and used to execute applications for managing and configuring other virtual machines on the computing device 300.

In some scenarios, one or more virtual disks 322a, 322b, and 322c that is used to support the operation of virtual machines 315a, 315b, 315c can be implemented in a separate physical machine. For example, such virtual disks can be implemented in data storage devices 108a-n, comprising cloud-based data storage infrastructure. Further, one or more of the data storage devices 108a-n can comprise a shared pool of data storage resources which are used to facilitate the virtual disks. In other words, one or more of the data storage devices comprising the data storage infrastructure can be logically grouped together to form a data storage pool. In some scenarios, the data storage pool is made accessible to one or more of workloads hosted on the cloud-based servers. For example, a plurality of cloud-based servers and/or a plurality of virtual machines which are hosted by one or more of the cloud-based servers can each have access to the same shared data storage pool.

Figure 4:
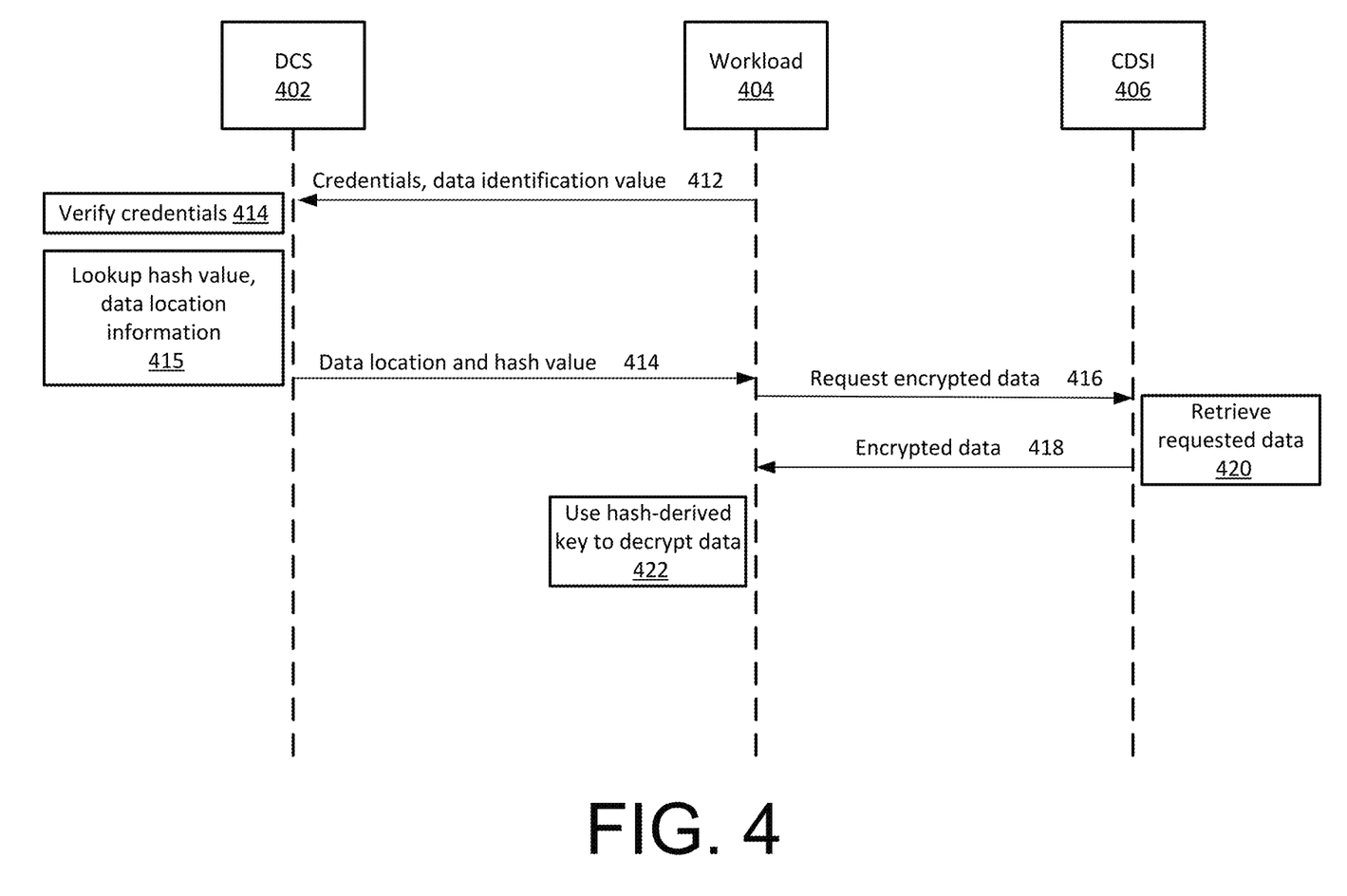
FIG. 4 is a flow diagram that is useful for understanding a data read operation disclosed herein.

Referring now to FIG. 4, a particular workload 404 (e.g., a workload hosted by a server 106a-n, or client machine 102a-n) may need to read data from a shared data pool hosted by cloud data storage infrastructure (CDSI) 406. For purposes of this example assume that the CDSI 406 is comprised of one or more servers 110a-n and/or data storage devices 108a-n.

When a read operation is needed, the process can begin by the workload 404 communicating 412 its credentials to the DCS 402 for authentication purposes. At 412 the workload 404 will also communicate to the DCS 402 a value comprising a data identifier. The data identifier can be a value or other information suitable to identify a particular object that is needed. In some scenarios, this data identifier can comprise a combination of elements.

At 414 the DCS 402 will determine whether the workload 404 has the proper credentials for requesting the identified data. This process can involve an authentication lookup table or database residing in a data store (e.g., data store 114 in FIG. 1). The authentication lookup table will specify which workloads are permitted access to each block in the shared memory pool.

Figure 6:
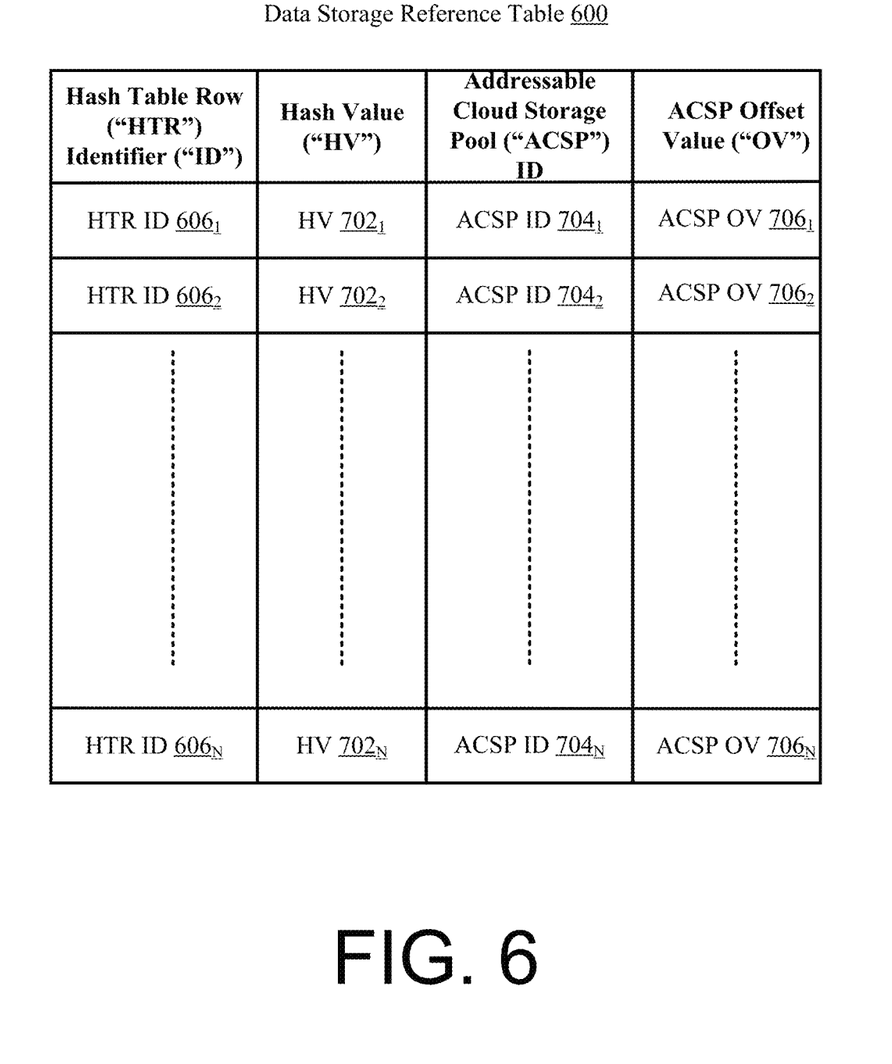
FIG. 6 is a drawing that is useful for understanding the contents of a data storage reference table.

The DCS 402 also maintains a table or relational database in which the data identifier information provided by the workload 404 can be used as an index value to look-up hash values for a block which is stored in the data pool. This table or relational database is sometimes referred to herein as a data storage reference table (DSRT). An example of a DSRT 600 is shown in FIG. 6. The exemplary DSRT 600 comprises a plurality of rows and columns. Each row includes the following four values associated with a given hash table (HTR) row ID: $606_1$, $606_2$, . . . , $606_N$ which uniquely identifies each block. In some scenarios, the HTR row ID can be used as the block identifier that is passed from a workload to the DCS 402 for purposes of identifying a block that is to be read.

For each such HTR row ID, the DSRT also includes a Hash Value ("HV") $702_1$, $702_2$, . . . , or $702_N$; an Addressable Cloud Storage Pool ("ACSP") ID $704_1$, $704_2$, . . . , or $704_N$ identifying a storage pool of a cloud storage; and an ACSP Offset Value ("OV") $706_1$, $706_2$, . . . , or $706_N$ indicating a block location in the storage pool. The ACSP ID and ACSP OV collectively provide the cloud storage pool address to cloud storage locations where the deduplicated data having the HV $702_1$ is stored.

Hash algorithms are well known in the art, and therefore will not be described herein. Any known or to be known hash algorithm can be used herein without limitation. However, a cryptographic hash function is preferred for this purpose. As is known, a cryptographic hash function is a special class of hash function. Cryptographic hash functions are one-way functions such that it infeasible to invert them and determine the original data based on the hash value. Consequently, there is no practical way to recreate the input data from the output of the hash function. Some examples of cryptographic hash functions include SHA-224, SHA-256, SHA-384, and SHA-512.

The present solution is not limited to hash algorithms. Other algorithms can be used here to compute a unique value from the disk block contents. These other algorithms should meet most of the same requirements as a cryptographic hash function—this it: it is deterministic so the same message always results in the same hash; it is quick to compute the hash value for any given message; and it is infeasible to find two different messages with the same hash value. For purposes of the present solution, these types of functions shall also be considered to be hash functions.

If a workload that initiated the read request is permitted to have access to the identified data, the DCS 402 will respond to the requesting workload by using the data identifier information (e.g. HTR ID) to look up at 415 information specifying a Hash Value ("HV") $702_1$, $702_2$, . . . , or $702_N$ associated with the specified data. This step can also involve determining the corresponding ASCP ID and ASCP OV which specify the exact location of the data. At 414, the data location information and hash value are communicated to the workload 404.

After receipt of the foregoing information at 414, the workload 404 will communicate with the CDSI at 416 to request the encrypted data at the specified location. For example, this communication can specify the ACSP ID and ACSP OV indicating a block location in the storage pool. At 420, the CDSI will retrieve the encrypted data at the specified location. At 418 this encrypted data is communicated to the workload 404 that requested it. Thereafter, the workload 404 can decrypt the requested data at 422.

A hash value 116 may not have a suitable for use directly as a key for encryption purposes, but the hash value can be used to calculate the encryption key by using a key derivation function (KDF). Accordingly, the workload can perform a key derivation operation to generate the necessary key for decryption. In some scenarios, this operation can also be performed at the DCS 402 and the key can then be provided to the workload at 414 instead of the hash value.

In cryptography, a KDF is a function that derives one or more secret keys from a secret value such as a master key, a password, or a passphrase using a pseudo-random function. In this case, the secret key is derived from the hash value. KDFs can be used to stretch keys into longer keys or to obtain keys of a required format, such as converting a group element that is the result of a Diffie-Hellman key exchange into a symmetric key for use with AES. A suitable key derivation function for purposes disclosed herein can include, but is not limited to well-known examples such as HKDF or PBKDF2.

Figure 5A:
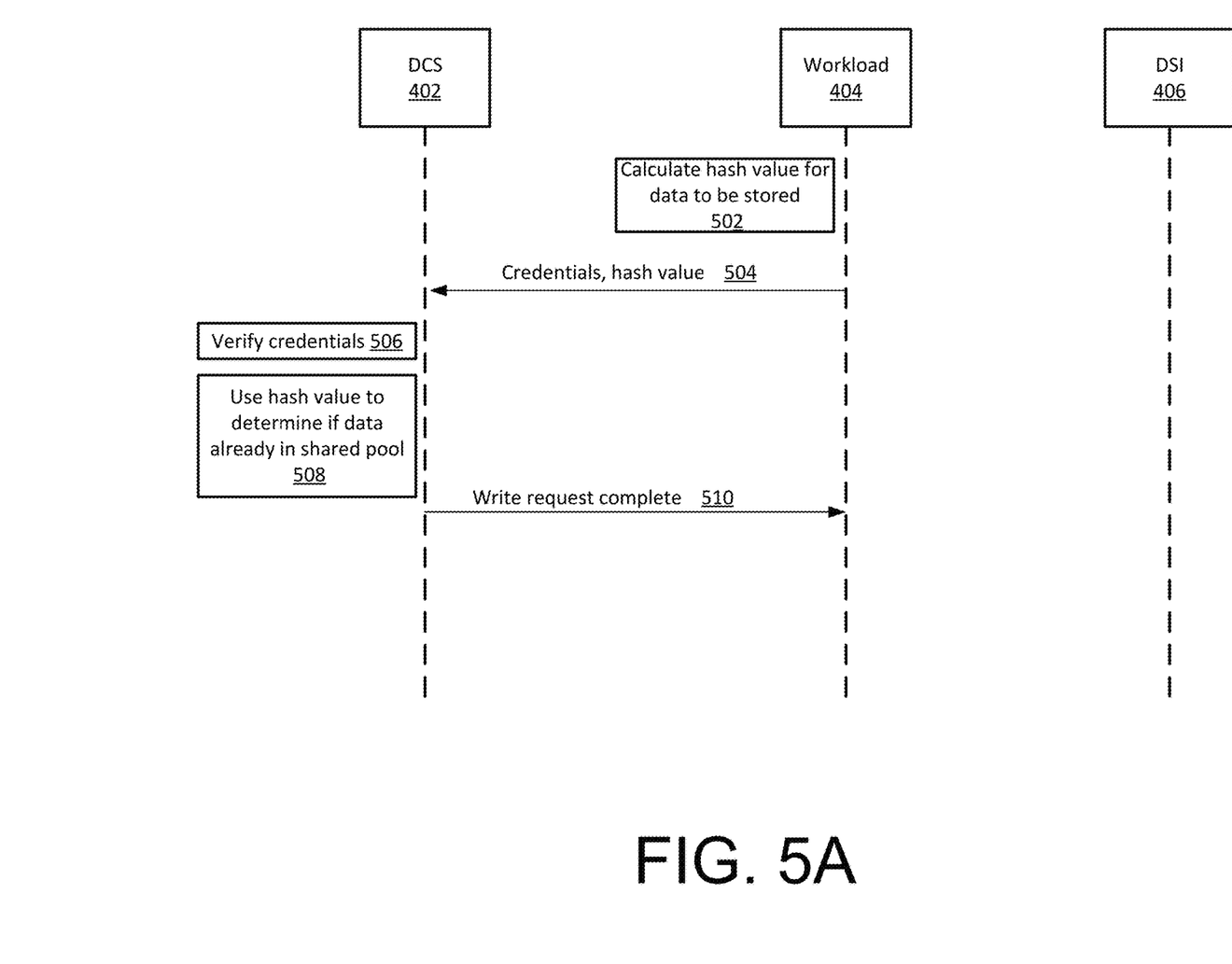
FIG. 5A is a flow diagram that is useful for understanding a write operation disclosed herein when a hash value is already present in a data storage reference table.

Referring now to FIG. 5A, there is shown a process flow diagram that is useful for understanding a write operation. When a workload 404 is performing a write request, it will already know the unencrypted contents of the data that is to be written. Accordingly, the workload can calculate the hash value for such data at 502. At 504 the workload can communicate to the DCS 402 its credentials, the data identification value, the calculated hash value for the block of data. At 506 the DCS can examine the provided credentials to authenticate the workload and verify that it has permission to perform a write operation. If the workload 404 is authenticated, then DCS 402 will use DSRT 600 and the provided information to determine whether the data corresponding to the hash value is already present in a particular shared pool. If necessary (e.g., if the data is not already present) the DCS can use the provided information to setup entries in DSRT 600 which associate the data identification value to the hash value, and the location where it is stored in cloud storage. It will be appreciated that in some scenarios, the workload can cache information similar to DSRT 600 so that subsequent read operations can be done without communicating with the DCS.

Depending on the particular implementation, a workload can communicate with the DCS 402 either before or after it has performed a write operation to the shared data pool. In a first scenario shown in FIGS. 5A and 5B, the workload communicates a hash value for a particular block of data to the DCS before the data has been written to the shared pool. Using its table of hash values, the DCS will determine at 508 whether a block of data having the specified hash value is already present in the shared pool. If so, the DCS can inform the workload at 510 that the write request is complete and no further action is required (since the data is already present in the shared pool).

Figure 5B:
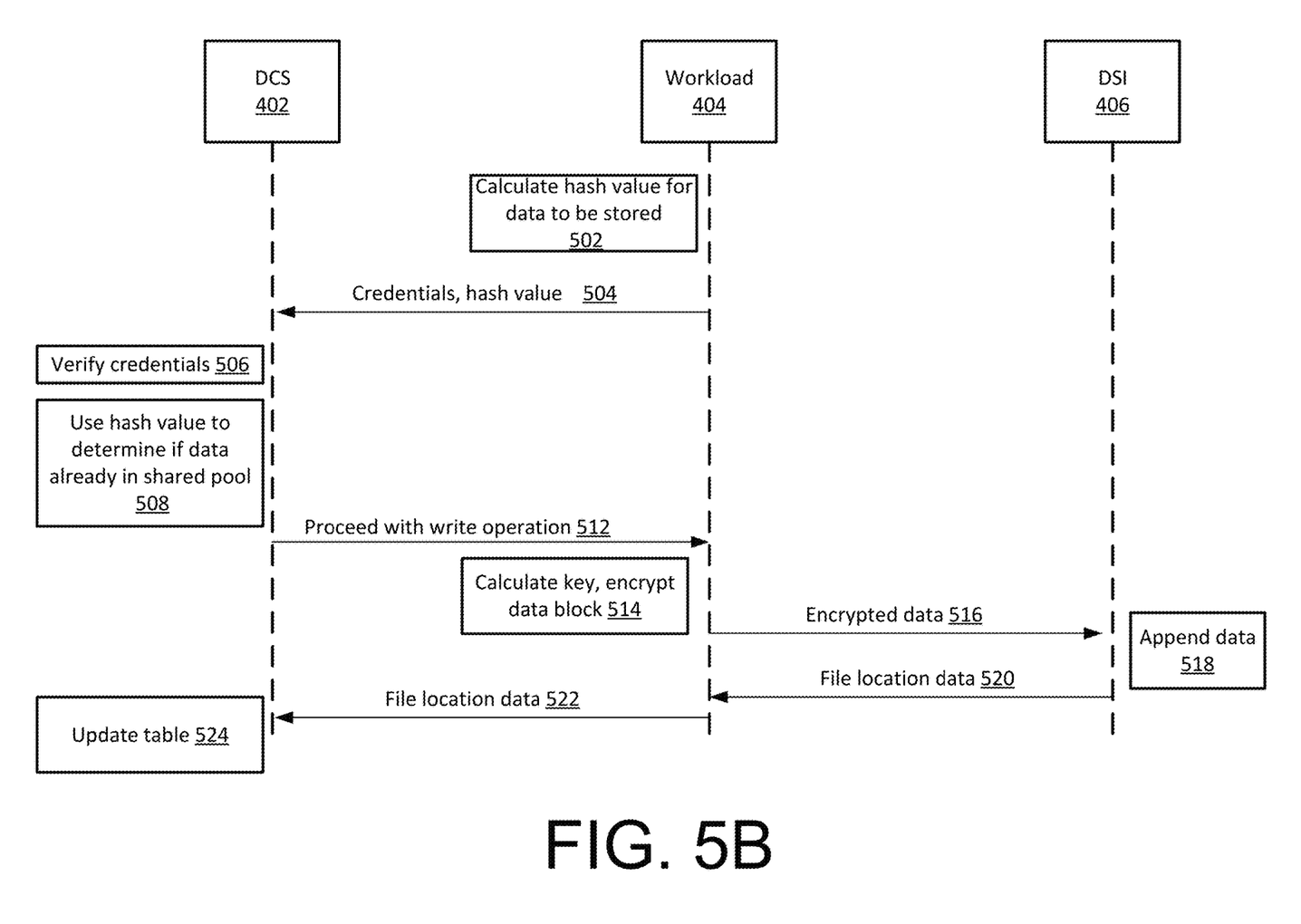
FIG. 5B is a flow diagram that is useful for understanding a write operation disclosed herein when a hash value is not already present in a data storage reference table.

But if the data is not already present in the shared pool, the DCS 402 can communicate this result to the workload at 512 as shown in FIG. 5B. More particularly, the DCS will communicate to the workload at 512 with an instruction to proceed with the write operation. The workload 404 can then encrypt the data at 514 using a key derived from the hash value, and communicate the encrypted data to the CDSI at 516. At 518 the CDSI will append the block of data to the end of the shared data pool. In some scenarios, the workload can at 520 receive location information from the CDSI 406 confirming the disk location where the block of data has been stored. The workload can then report back to the DCS at 522 that data having the specified hash value has been stored in an identified shared pool at the specified location. Thereafter, the DCS can update its hash table at 524.

Figure 5C:
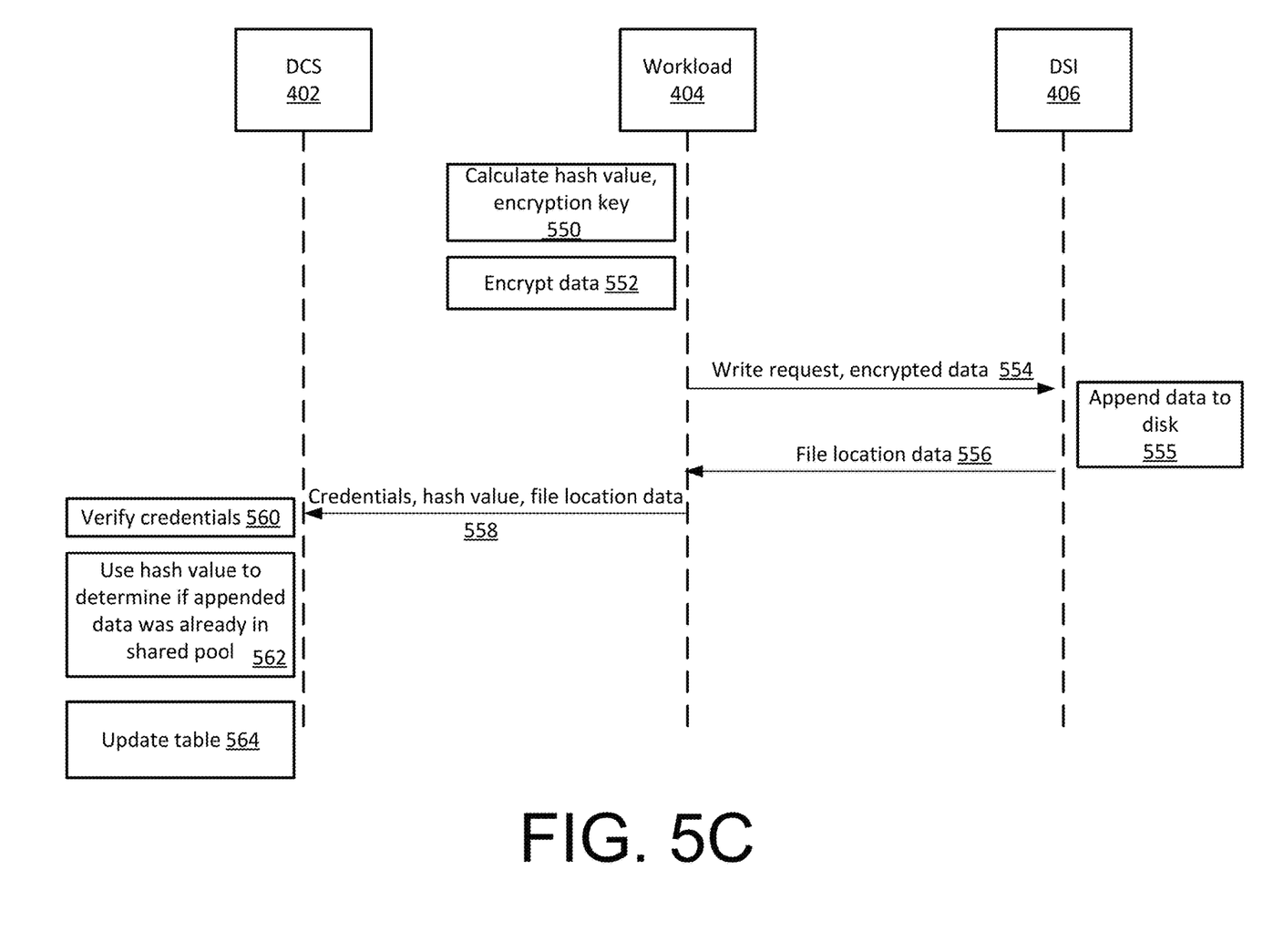
FIG. 5C is a flow diagram that is useful for understanding an alternative implementation of a memory access control system.

In a second scenario that can be more efficient, a workload 404 performs the write operation before communicating with the DCS 402. This second scenario is illustrated in FIG. 5C. At 550 the workload 404 will calculate the hash value based on the data to be stored, and derive the necessary encryption key from the hash value. Thereafter at 552 the workload will use the encryption key to encrypt the data to be stored. The workload then communicates with the CDSI at 554 to cause the encrypted data to be appended to the shared pool at the end of the data store at 555. At that point the CDSI will communicate location data to the workload at 556 specifying where on the disk the data has been written.

At 558 the workload will provide its credentials to the DCS 402, and will inform the DCS that it has caused data with a particular hash value to be written to the end of the shared data pool, specifying a particular data storage location. In some scenarios, this location information can include an ASCP ID and ASCP OV. At 560 the DCS 402 will examine the provided credentials to authenticate the workload 404. If the workload 404 is permitted to perform the write transaction, then the DCS 402 will proceed at 562 to compare the provided hash value to hash values (HVs 702$_1$, 702$_2$, 702$_N$) already present in its DSRT 600. In this way, the DCS 402 can determine if data having the specified hash value has previously been stored as part of the shared data pool.

At 564 the DSRT 600 can be updated, depending on the outcome of the comparing step at 562. If the hash value provided by the workload at 558 is not present in the DSRT 600, it will mean that the data did not previously exist in the shared data pool, and is therefore not duplicative. In such a scenario, DSRT 600 can be updated at 562 to include the identifier (HTR ID), the hash value (HV), and the location (ASCP ID and ASCP OV) for the new data.

Alternatively, if the DCS determines at 562 that the data was already present in the shared data pool, it will change a pointer value for the data written at 555 to be the same pointer value assigned to the identical preexisting data within the data pool. The location of the new data appended to the disk at 555 will then be marked free so that it can be used for storing other data. In order to appreciate the purpose of this step, it may be noted that the various data storage scenarios described herein can involve storing the contents of multiple virtual disks in CDSI 406. For each disk, it is necessary to maintain a translation from the disk and LBA information to the hash information.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope should be defined in accordance with the following claims and their equivalents.

What is claimed is:

1. A method for secure shared access to encrypted data in a data store, comprising:

maintaining a data storage reference table (DSRT) at a data control server (DCS) for a plurality of blocks of data of a shared data pool, the shared data pool being one or more data storage devices logically grouped together and accessible to a plurality of computing entities, and the blocks of data being stored in encrypted form to prevent unauthorized access to any one of the blocks of data by the plurality of computing entities;

specifying, for at least one block of data of the shared data pool, location information and a hash value, the location information being configured to enable access to the at least one block of data stored in one of the data storage devices of the shared data pool, and the hash value being computed for the at least one block of data and configured to decrypt that block of data when stored in encrypted form; and performing by the DCS post-write request operations that comprise:

receiving (i) a hash value for unencrypted content from a first computing entity of the plurality of computing entities, and (ii) file location data specifying a location in the shared data pool where a given block of data associated with the unencrypted content was written;

determining whether the first computing entity was permitted to perform a write transaction for the given block of data;
comparing the received hash value with a list of hash values in the DSRT to determine that the unencrypted content is duplicative of content previously written to the shared data pool based on the received hash value being present in the list of hash values, responsive to a determination that the first computing entity was permitted to perform the write transaction for the given block of data; and
changing a pointer value for the given block of data to be the same as that of another block of the shared data pool based on the comparing, so that the given location indicated by the location information remains usable for storage of other data.

2. The method according to claim 1, further comprising updating the DSRT to include the received hash value for the unencrypted content when a determination is made that the received hash value is not present in the list of hash values.

3. The method according to claim 1, further comprising:
receiving at the DCS, from the first computing entity, authentication information; and
analyzing the authentication information to determine whether the first computing entity is permitted to perform a write operation associated with the unencrypted content.

4. The method according to claim 3, wherein the comparing is performed when a determination is made that the first computing entity is permitted to perform the write operation.

5. The method according to claim 1, wherein the blocks of data data are encrypted prior to being stored by using an encryption key that has been derived from the hash value.

6. The method according to claim 1, further comprising:
receiving a request from a second computing entity of the plurality of computing entities, said request specifying identifier information for at least one block of the blocks of data; and
responsive to said request, selectively facilitating a decryption operation of the block which has been specified, by communicating to the second computing entity one of the plurality of hash values which is specified in the DSRT and which corresponds to the identifier information;
wherein a decryption key for the block which has been specified is derivable from the hash value which is communicated to the second computing entity.

7. The method according to claim 6, further comprising decrypting the content of the shared data pool which has been requested by the second computing entity using the decryption key.

8. A system for facilitating secure shared access to encrypted data in a data store, comprising:
a data control server (DCS) comprising at least one electronic processor and a server data store accessible to the at least one electronic processor;
the DCS configured to maintain a data storage reference table (DSRT) for a plurality of blocks of data of a shared data pool, the shared data pool being one or more data storage devices logically grouped together and accessible to a plurality of computing entities, and the blocks of data being stored in encrypted form to prevent unauthorized access to any one of the blocks of data by the plurality of computing entities;
the DSRT specifying for at least one block of data of the shared data pool, location information and a hash value, the location information being configured to enable access to the at least one block of data stored in one of the data storage devices of the shared data pool, and the hash value being computed for the at least one block of data and configured to decrypt that block of data when stored in encrypted form;
wherein the DCS performs post-write request operations that comprise:
receiving (i) a hash value for unencrypted content from a first computing entity of the plurality of computing entities, and (ii) file location data specifying a location in the shared data pool where a given block of data associated with the unencrypted content was written;
determining whether the first computing entity was permitted to perform a write transaction for the given block of data;
comparing the received hash value with a list of hash values in the DSRT to determine that the unencrypted content is duplicative of content previously written to the shared data pool based on the received has value being present in the list of has values, responsive to a determination that the first computing entity was permitted to perform the write transaction for the given block of data; and
changing a pointer value for the given block of data to be the same as that of another block of the shared data pool based on the comparing, so that the given location indicated by the location information remains usable for storage of other data.

9. The system according to claim 8, wherein the DCS is configured to update the DSRT to include the received hash value for the unencrypted content when a determination is made that the received hash value is not present in the list of hash values.

10. The system according to claim 8, wherein the DCS is configured to:
receive, from the first computing entity, authentication information; and
analyze the authentication information to determine whether the first computing entity is permitted to perform a write operation associated with the unencrypted content.

11. The system according to claim 10, wherein the comparing is performed where a determination is made that the first computing entity is permitted to perform the write operation.

12. The system according to claim 8, wherein the blocks of data unit are encrypted prior to being stored by using an encryption key that has been derived from the hash value.

13. The system according to claim 8, wherein the DCS is responsive to a requests from a second computing entity of the plurality of computing entities, said request specifying identifier information for at least one block of the blocks of data, the DCS configured to selectively facilitate a decryption operation of the block which has been specified by communicating to the second computing entity which initiated the request one of the plurality of hash values which is specified in the DSRT and which corresponds to the identifier information;
wherein a decryption key for the block which has been specified is derivable from the hash value which is communicated to the second computing entity.

14. The system according to claim 13, wherein the second computing entity is configured to decrypt the content of the shared data pool which has been requested by using the decryption key.

15. A method for secure shared access to encrypted data in a data store, comprising:
- maintaining a data storage reference table (DSRT) at a data control server (DCS) for a plurality of shared data units, the plurality of shared data units being stored in encrypted form in a shared data pool that is hosted by at least one data storage device, and the shared data units being accessible to a plurality of computing entities;
- specifying for each said shared data unit of the plurality of shared data units identifier information, location information and a hash value, the location information being configured to enable access to the shared data unit stored in the shared data pool, and the hash value comprising a unique value that is computed from a respective shared data unit of the plurality of shared data units; and
- performing by the DCS post-write operations that comprise:
  - receiving (i) a hash value for unencrypted content from a first computing entity of the plurality of computing entities, and (ii) file location data specifying a location in the shared data pool where a given shared data unit associated with the unencrypted content was written;
  - determining whether the first computing entity was permitted to perform a write transaction for the given shared data unit;
  - comparing the received hash value with a list of hash values in the DSRT to determine whether the received hash value is present in the list of hash values, responsive to a determination that the first computing entity was permitted to perform the write transaction for the given shared data unit; and
  - selectively changing a pointer value for the given shared data unit to be equal to a pointer value associated with a hash value in the list of hash values that matches the received hash value.

16. The method according to claim 15, wherein:
the DCS post-write request operations further comprise determining whether the first computing entity was permitted to perform a write transaction for the given shared data unit; and
the received hash value is compared with a list of hash values in the DSRT, responsive to a determination that the first computing entity was permitted to perform the write transaction for the given shared data unit.

* * * * *